UNITED STATES PATENT OFFICE.

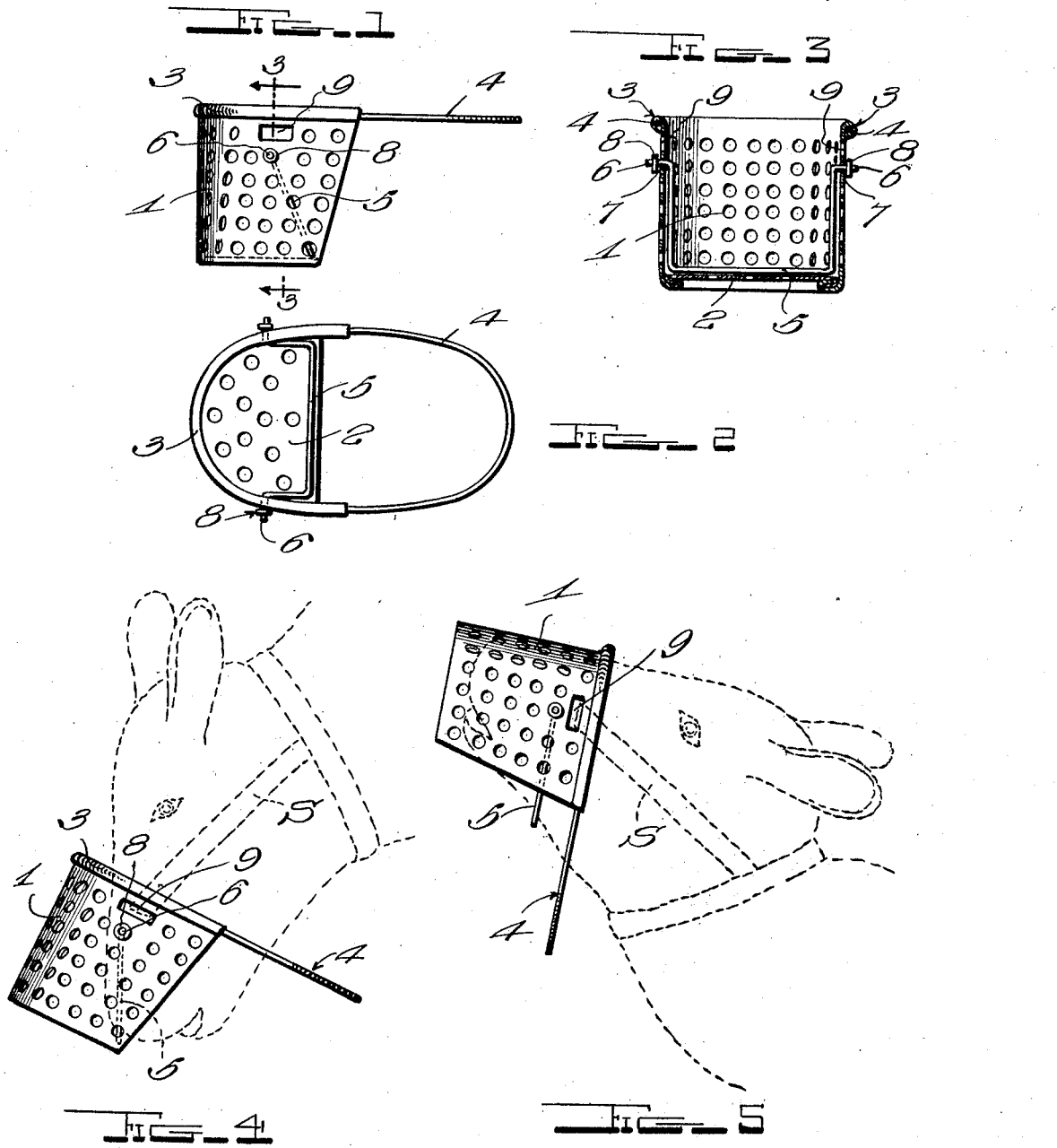

FRANK E. JOHNSON, OF TRINIDAD, COLORADO.

WEANER.

1,395,116. Specification of Letters Patent. Patented Oct. 25, 1921.

Application filed September 15, 1920. Serial No. 410,518.

*To all whom it may concern:*

Be it known that I, FRANK E. JOHNSON, a citizen of the United States, residing at Trinidad, in the county of Las Animas and State of Colorado, have invented new and useful Improvements in Weaners, of which the following is a specification.

My present invention pertains to calf and colt weaners and it contemplates the provision in a device of the character set forth, whereby the animal upon which the weaner is fastened may when it lowers its head, be permitted to graze but upon raising its head will be prevented from nursing.

The invention further contemplates the provision of a weaner that is inexpensive to produce and may be readily and easily applied and removed from the muzzle of the animal and when properly applied will prevent displacement by the animal wearing the same.

The invention in all of its details will be fully understood from the following description and claim when the same are read in connection with the drawings herewith appertaining, in which—

Figure 1 is a side elevation of my novel device.

Fig. 2 is a top plan view of the device.

Fig. 3 is a sectional view taken in the plane indicated by the line 3—3 of Fig. 1.

Figs. 4 and 5 are views illustrating the invention as applied to a calf.

Similar numerals of reference designate corresponding parts in all the views of the drawings.

My novel weaner comprises the muzzle encircling body formed of the portion 1 and the bottom 2 and said portions 1 and 2 are preferably foraminous as illustrated.

At its upper end the portion 1 is provided with the hollow band 3 in which I insert a bail 4.

Arranged in and hinged with respect to the side walls of the portion 1 is my novel U-shaped member 5 that is provided with the laterally bent ends 6 that pass through and hinge by means of the apertures 7. At their outer ends the laterally bent portions 6 are provided with collars or flanges 8 whereby the bail 5 will be precluded from casual displacement with respect to the opening 7.

At any suitable point beneath the rim 3 and in the sides of the member 1 I cut apertures 9 for the reception of the straps of a halter.

In the practical use of the invention, the device is secured on the muzzle of a calf or other animal and when said animal attempts to graze the U-shaped member will swing forwardly to the position indicated by Fig. 4. However, when the animal raises its head and attempts to nurse, the member 5 will assume the position shown in Fig. 5 and parallel with the bail 4 and thus the muzzle of the animal will be effectually closed. Naturally this will not only prevent the animal from nursing but because of the uncomfortable binding of the member 5 under the lower jaw of the animal, it will readily lower its head to the position shown in Fig. 4.

Having described my invention, what I claim and desire to secure by Letters-Patent is:—

In a calf weaner, the combination of a muzzle encircling portion of foraminous material, a bottom wall of foraminous material secured to the muzzle encircling portion, a channel formed in the upper end of the muzzle encircling portion, a bail adapted to rest in the channel and extend rearwardly below the lower jaw of the calf, and a swinging member hinged in the muzzle encircling portion and adapted to rest parallel with the bail when the head of the calf is thrust upwardly.

In testimony whereof I have hereunto set my hand in presence of two subscribing witnesses.

FRANK E. JOHNSON.

Witnesses:
MAX STRASBURG,
J. B. BROADDUS.